May 5, 1931.  F. W. GAY  1,804,006
AUTOMATIC AIRPLANE CONTROL MECHANISM
Filed March 17, 1930  2 Sheets-Sheet 1
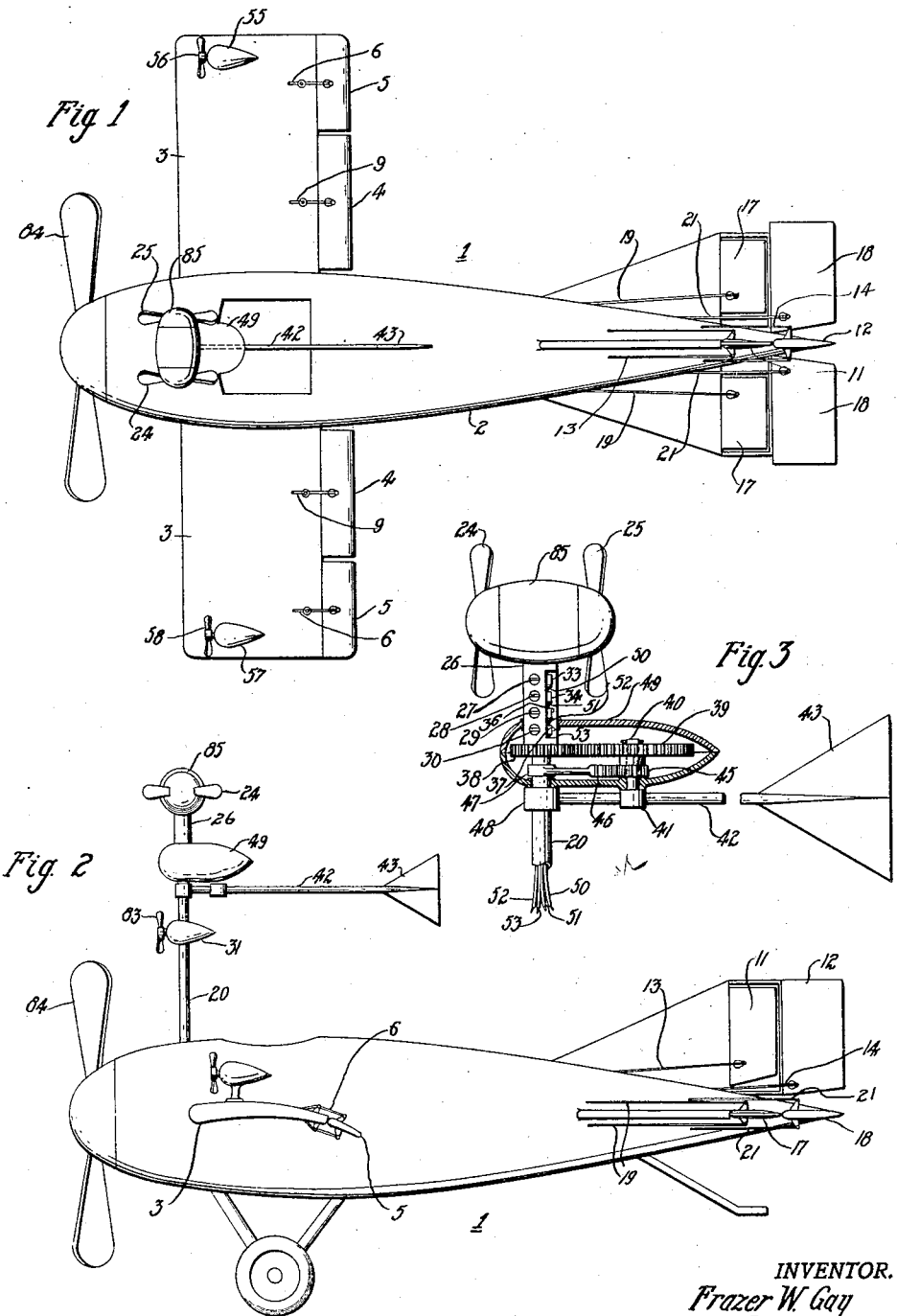
INVENTOR.
Frazer W. Gay
BY
George D. Richards
ATTORNEY.

May 5, 1931.  F. W. GAY  1,804,006

AUTOMATIC AIRPLANE CONTROL MECHANISM

Filed March 17, 1930  2 Sheets-Sheet 2

INVENTOR.
Frazer W. Gay
BY George D. Richards
ATTORNEY.

Patented May 5, 1931

1,804,006

UNITED STATES PATENT OFFICE

FRAZER W. GAY, OF NEWARK, NEW JERSEY

AUTOMATIC AIRPLANE CONTROL MECHANISM

Application filed March 17, 1930. Serial No. 436,334.

This invention relates, generally, to airplane operation and the invention has reference, more particularly, to novel automatic means for controlling or aiding in the control of the operation of an airplane in the event that the manual operation thereof is defective or improper for any reason.

Heretofore, airplanes have been largely operated entirely manually which places great dependence upon the personal element and this has often been found unreliable and hazardous. It is difficult at best for an aviator to properly handle the triple controls of an airplane and in times of stress, as for instance when a plane has gone into a tailspin, the aviator often proves incompetent to properly operate simultaneously the three airplane controls. Experience has shown that even experienced aviators become incapacitated at such times and "freeze" the controls, often times resulting in a disastrous accident.

In maneuvering an airplane, except when changing altitude, it is necessary to simultaneously operate the three controls, i. e. the rudder, the elevators and the ailerons. The operation of these three controls requires nice calculation and a pilot cannot be depended upon in all emergencies to properly operate all of these controls and especially the ailerons which are difficult to operate at best, for unless the ailerons are properly set when making a turn the plane will sideslip or may even go into a spin and once in a spin, extremely skillful handling of all three controls simultaneously is necessary to straighten the plane out.

The principal object of the present invention is to provide a novel automatic airplane control means or mechanism which is adapted to automatically and properly control the movements of an airplane in the event that the manual operation thereof should prove defective at any time.

Another object of the present invention is to provide a novel automatic airplane control mechanism of the above character having banking means automatically operative upon sideslip of the airplane to produce a powerful corrective banking or tilting of the airplane in the proper direction to thereby eliminate the sideslip and cause the plane to maneuver properly.

Another object of the present invention is to provide a novel automatic airplane control mechanism of the above character having means for causing an airplane to automatically climb in the event that its speed exceeds a predetermined value, and which is also operative, in the event that the airplane speed falls below its predetermined safe flying value, to cause the airplane to descend until a proper safe speed has been attained.

Still another object of the present invention is to provide an automatic airplane control mechanism of the above character which operates upon control surfaces which are separate and distinct from those which are manually operated by the airplane pilot.

A further object of the invention lies in the provision of an automatic airplane control mechanism which is normally inactive, but becomes immediately active to assist the airplane operator in operating the airplane in the event that the manual operation thereof is imperfect; the said control mechanism acting to overcome the manual operation in the event that the latter is totally wrong.

Still another object of the present invention is to provide an automatic airplane control mechanism or means of the above character which is of simple, inexpensive construction and reliable in operation.

Other objects of the invention, not at this time more particularly enumerated, will be clearly understood from the following detailed description of the same.

The invention is clearly illustrated in the accompanying drawings, in which:—

Fig. 1 is a plan view of an airplane equipped with the novel automatic control mechanism of this invention;

Fig. 2 is a view in side elevation of the airplane shown in Fig. 1;

Fig. 3 is an enlarged fragmentary side view of a portion of the novel automatic control mechanism;

Similar characters of reference are employed in the above described views, to indicate corresponding parts.

Figure 5:
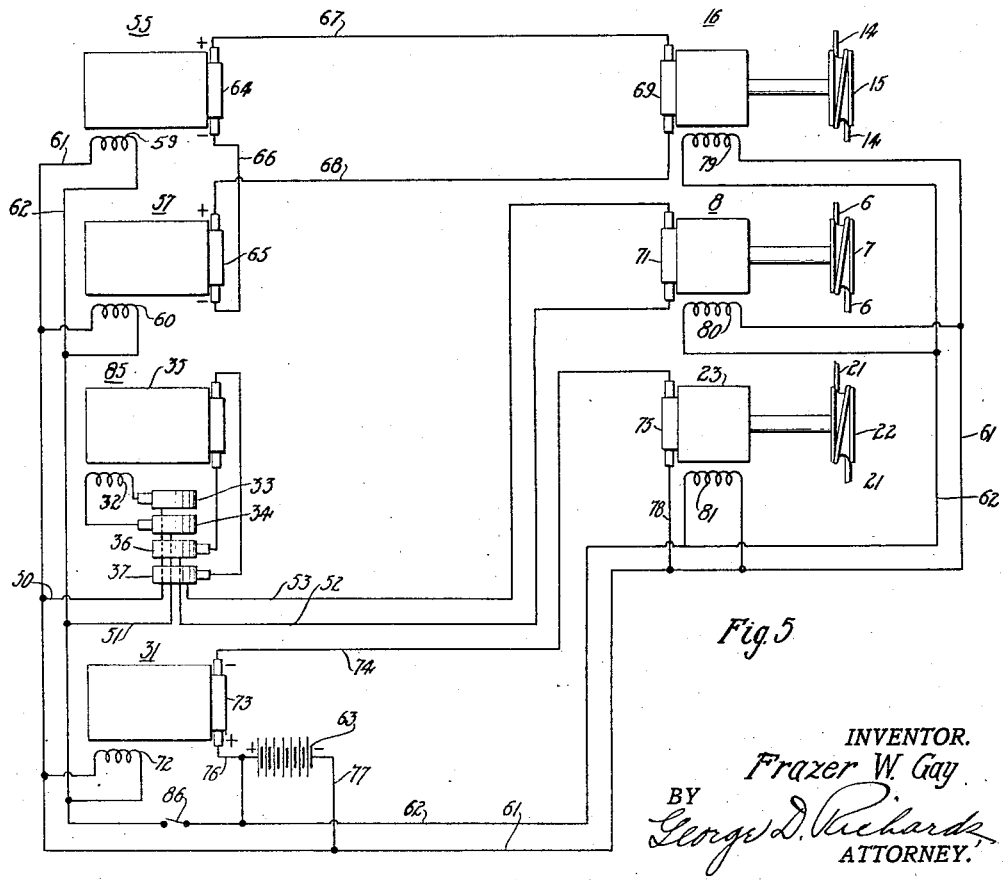
Fig. 5 is a wiring diagram of the novel automatic control mechanism of this invention.

Referring now to the said drawings, the reference numeral 1 designates an airplane of the monoplane type equipped with the novel automatic airplane control mechanism of this invention. Airplane 1 has a fuselage or frame 2 and wings 3, 3 which are equipped with two sets of ailerons, an innermost set 4, 4 and an outer set 5, 5 positioned outwardly of the inner set 4, 4. The inner set of ailerons 4, 4 are somewhat less effective or powerful than the outer set 5, 5 and are connected by operating cable 9 to the pilot's stick or hand wheel (not shown) in the customary manner. The outer set of ailerons 5, 5 are connected by cable 6 to be operated by the control mechanism of this invention. Thus, as shown in Fig. 5, the operating cable 6 of ailerons 5, 5 is shown passing over a driving sheave 7 mounted on the shaft of a D. C. motor 8 positioned within the fuselage 2.

Airplane 1 is equipped with two rudders, an inner rudder 11 and an outer rudder 12. The inner rudder 11 is somewhat less effective or powerful than the outer rudder 12 and is connected by cable 13 to the pilot's rudder bar (not shown) in the usual manner. The outer rudder 12 is connected by cable 14 for operation by the control mechanism of this invention. Cable 14 passes over a sheave 15 (see Fig. 5) that is keyed upon the shaft of a D. C. motor 16 contained within the fuselage 2.

Airplane 1 is equipped with two sets of elevators, an inner set 17, 17 and an outer set 18, 18 positioned rearwardly of the inner set 17, 17. The inner set of elevator 17, 17 are less effective or less powerful than the outer set 18, 18 and are connected by operating cable 19 to the pilot's stick or wheel as is customary. The outer set of elevators 18, 18 are connected by cable 21 for operation by the control mechanism of this invention. Cable 21 passes over a sheave 22 (see Fig 5) that is keyed upon the shaft of a D. C. motor 23 contained within the fuselage 2.

A strut 20 extends upwardly from the upper forward portion of the fuselage 2 and carries a D. C. generator 31, preferably positioned out of the slip stream of airplane propeller 84, which generator is driven by a propeller 83 keyed upon the armature shaft thereof. A D. C. generator 85 having propellers 24 and 25 at the ends of its armature shaft is positioned upon the top of the strut 20. Generator 85 has a sleeve 26 secured thereto and depending therefrom. Sleeve 26 is provided with four brush holder boxes 27 to 30 spaced thereon. The leads of the field winding 32 (see Figs. 3 and 5) of generator 85 are connected to brush holder boxes 27 and 28. The brushes of boxes 27 and 28 contact with slip rings 33 and 34 which are mounted upon, though insulated from, the upper portion of strut 20. Likewise the leads of the armature 35 of generator 85 are connected to brush holder boxes 29 and 30. The brushes of boxes 29 and 30 press against slip rings 36 and 37 also mounted upon, though insulated from, the upper portion of strut 20.

Sleeve 26 is rotatably mounted upon the strut 20 by means of suitable bearings and has a pinion 38 fixed upon its lower end portion. The turning of pinion 38 about strut 20 will also cause the sleeve 26 and generator 85 to turn about this strut. Pinion 38 meshes with a gear 39 which is rotatably mounted upon a vertical stud shaft 40. Stud shaft 40 is secured at its lower end to a boss 41 provided upon the operating arm 42 of a wind vane 43. A pinion 45 is rotatably mounted upon stud shaft 40 below gear 39 and is affixed to the hub of this gear. Pinion 45 meshes with a sector gear 46 which has its hub 47 rigidly mounted upon the strut 20 so as to be immovable with respect thereto.

The forward end of operating arm 42 is provided with a bearing 48 mounted upon the strut 20. Bearing 48 rotatably supports operating arm 42 of the wind vane 43 upon strut 20. A stream lined housing 49 is illustrated as enclosing the pinions 38 and 45 and gears 39 and 46 and is supported upon the operating arm 42 to turn therewith about the strut 20. Slip rings 33 and 34 are connected to leads 50 and 51 which extend downwardly within the hollow interior of strut 20. Likewise the slip rings 36 and 37 are connected to leads 52 and 53 which also extend downwardly within the interior of strut 20. A D. C. generator 55 is mounted upon one wing tip of the airplane 1 and has a driving propeller 56 keyed upon its armature shaft. Likewise a similar D. C. generator 57 is mounted upon the other wing tip of the airplane 1 and has a driving propeller 58 keyed upon its armature shaft.

Referring more particularly to the wiring diagram of Fig. 5, it will be noted that the field windings 59 and 60 of generators 55 and 57 are supplied with energizing current from D. C. busses 61 and 62. Direct current is supplied to busses 61 and 62 from a battery 63. The armatures 64 and 65 of generators 55 and 57, respectively, have their minus brushes connected together by a lead 66 while their positive brushes are respectively connected by leads 67 and 68 to the brushes of armature 69 of the rudder operating motor 16. The field winding 32 of generator 85 is connected through slip rings 33 and 34 and leads 50 and 51 to busses 61 and 62. The armature 35 of generator 85 is connected through slip rings 36 and 37 and leads 52 and 53 to the brushes of armature 71 of aileron operating motor 8.

Field winding 72 of generator 31 is connected across busses 61 and 62. The minus brush of armature 73 of generator 31 is connected by a lead 74 to one brush of the armature 75 of elevator operating motor 23. The positive brush of armature 73 is connected to the other brush of armature 75. This circuit is by way of lead 76 to the positive terminal of battery 63, through battery 63 and by way of leads 77, 61 and 78 to the other bus of armature 75. The field windings 79, 80 and 81 of motors 16, 8 and 23 respectively, are connected across busses 61 and 62.

During normal flying, the airplane 1 is heading directly into the wind, causing the armatures of generators 55 and 57 to be driven at equal speeds by their respective propellers 56 and 58. Since these generators are similar and are operating at similar speeds, the E. M. F's. generated by them are equal and opposed so that the net voltage across the brushes of armature 69 of the rudder operating motor 16 is substantially zero, causing motor 16 and rudder 12 to be in their neutral positions. Likewise with the airplane operating normally and moving directly into the wind, the longitudinal axis of generator 85 extends transversely to the direction of motion of the airplane or transversely to the longitudinal axis of the fuselage 2, as shown in Figs. 1 and 2. With the generator 85 so positioned, the propellers 24 and 25 are tangent to the direction of motion of the wind and consequently do not rotate so that the generator armature 35 is stationary. With the generator armature 35 stationary no voltage is produced across the brushes of armature 71 and consequently the aileron operating motor 8 does not function, the same being stationary in its neutral position. The generator 31 is designed so that with the airplane advancing at a normal speed directly into the wind, the E. M. F. generated by this generator is just equal and opposite to the E. M. F. of the battery 63 so that during normal flying the voltage across the brushes of the armature 75 is zero, causing elevator operating motor 23 to remain in its neutral position with elevators 18, 18 in neutral position.

In operation, as long as the airplane 1 is heading directly into the wind and makes easy and gradual maneuvers at substantially the normal speed of the airplane, the automatic control mechanism of this invention will be inactive, but as soon as the airship maneuvers incorrectly, for example, should the same yaw, sideslip or operate at too high a speed or at too low a speed, then the automatic control mechanism will immediately become active to correct and perfect the maneuver. If it be assumed for instance that the airplane 1 otherwise operating normally should commence to yaw to the right as viewed in Fig. 1, then generator 57 will begin turning at a higher speed than generator 55, causing a current to flow from armature 65, through lead 68, rudder operating motor armature 69, lead 67, and lead 66 back to armature 65. This current will operate rudder motor 69 in the desired direction to cause airplane 1 to yaw to the left. This tendency of the rudder 12 to cause the airplane to yaw to the left continues until the same is again straightened out and generators 55 and 57 are operating at equal speeds. Similarly should the airplane 1 tend to yaw to the left, rudder 12 will be operated in the reverse direction tending to make the airplane yaw to the right, resulting in the correction of the direction of movement.

Figure 4:
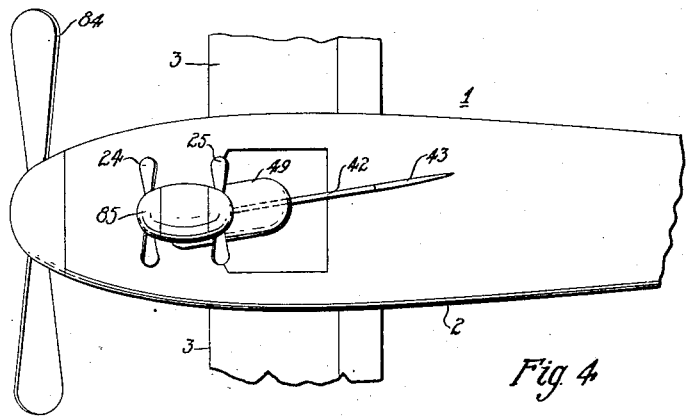
Fig. 4 is a fragmentary plan view illustrating the operation of the aileron control mechanism.

Should the airplane 1 tend to sideslip as for instance as the result of an improper bank during turning, wind pressure acting upon wind vane 43 will cause this vane to turn about strut 20 either in one direction or the other. The gearing within housing 49 multiplies the movement of vane 43 and causes generator 85 to have a much greater movement about strut 20 than the vane. Thus, for example, should the airplane 1 sideslip towards the left as viewed in Fig. 1, thereby causing the wind vane 43 to turn through a relatively small angle into the position illustrated in Fig. 4, the movement of the wind vane 43 will cause generator 85 to move from its inoperative position shown in Fig. 1 to the operative position shown in Figs. 3 and 4. The turning of wind vane 43 causes pinion 45 to revolve upon fixed gear 46. The turning of pinion 45 causes gear 39 to have a similar rotation. The rotation of gear 39 causes pinion 38 to revolve, carrying with it sleeve 26 and generator 85. Owing to the relatively small size of pinions 45 and 48 as compared with gears 46 and 39, a relatively small angular movement of wind vane 43 will cause a much greater angular movement of generator 85, although in an opposite direction. Propeller 24 of generator 85 is now heading into the wind at substantially 90° from its former inoperative position so that generator armature 35 is caused to deliver a heavy current through leads 52 and 53 to armature 71 of aileron operating motor 8 causing this motor to operate sheave 7 and cable 6 to effect the downward tipping of the left aileron 5 and the upward tipping of the right aileron 5. This action of the ailerons will bring the airplane out of its sideslip and as the same approaches its normal forward direction of flight, the wind vane 43 will return again to its normal position as viewed in Fig. 1, thereby causing the generator 85 to move to its normal inoperative position transversely of the direction of motion. Similarly should the airplane tend to sideslip towards the right, the wind vane 43 will be moved to the left, resulting in the turning of generator 85 from its normal transverse inoperative position towards an operative position with the propeller 25 forwardly. The generator armature 35 now turns in the opposite direction to cause aileron motor 8 to also turn in the opposite direction to thereby correct the sideslip. It will be apparent that for slight sideslips the deflection of wind vane 43 will be slight and consequently the generator 23 will not be turned through a complete right angle but to a lesser degree so that the aileron motor 8 does not turn the ailerons as far. In other words, the amount of movement of the ailerons is determined entirely by the amount of sideslip of the airplane. The gear 46 is provided with suitable stops so as to prevent vane 43 from turning through an angle greater than that corresponding to a 90° turn of the generator 85.

In the event that the airplane 1 should be slowed down below its normal forward speed, the E. M. F. generated by the armature 73 of the generator 31 will fall below the E. M. F. of battery 63, resulting in a current flowing from battery 63 through lead 76, armature 73, lead 74, armature 75 of elevator motor 23, lead 78, lead 61 and lead 77 back to battery 63. This current will cause elevator motor 23 to operate sheave 22 and cable 21 to move elevators 18 downwardly causing the plane to glide downwardly at a steeper angle until the resulting increased speed of the airplane causes generator 21 to generate the same voltage as that produced by battery 63. It will thus be seen that the airplane is automatically prevented from stalling because as soon as it reaches a stalling speed its nose is automatically dipped downwardly, thereby increasing the speed. Also should the speed of the airplane increase greatly above normal, the armature 73 of generator 31 will send a current through armature 75 of elevator motor 23 against the E. M. F. of battery 63 to cause the elevators 18 to operate to cause the airplane to climb until the speed thereof is again normal.

It will thus be noted that the novel automatic control mechanism of this invention cooperates with the pilot in the control of the airplane so that inaccuracies of judgment of the pilot are automatically corrected for. Only in the event that the pilot's actions are entirely wrong does the master automatic control overpower his actions and cause the airplane to operate properly. As long as the pilot makes easy turns and smooth regular maneuvers, the automatic control will be inactive but appreciable errors of manual control will render the same active.

It will be noted that the corrective action of the automatic control mechanism varies proportionately to the necessity for such corrective action, i. e. the extent to which the automatically operated control surfaces are moved depends entirely upon the extent to which the airplane is deviating from normal proper operation. It will be apparent that instead of using motors as 16, 8 and 23 for operating the control surfaces, electromagnets may be used for this purpose, if desired. The automatic control mechanism may be rendered inoperative when desired by merely opening manual switch 86 in bus 62.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In an airplane having a rudder, a motor and connected transmission means for operating said rudder, propeller driven generators mounted on the winds of said airplane, the generator of one wing being connected in opposition to the generator of the opposite wing, said generators being connected to said motor, whereby the differential energy output of said generators serves to operate said motor.

2. In an airplane having ailerons, a motor and connected transmission means for operating said ailerons, a reversible propeller driven generator carried by said airplane and connected to said motor to supply operating energy thereto, and means responsive to sideslip of said airplane for effecting the reversal of said generator, whereby reversal of said motor is likewise effected.

3. In an airplane having elevators, a motor and connected transmission means for operating said elevators, a propeller driven generator carried by said airplane and arranged to generate a voltage of a magnitude responsive to the speed of said airplane, and constant voltage means connected in opposition to said generator, said generator and said constant voltage means being connected in energy supplying relation to said motor.

4. In an airplane having control surfaces, motors for operating said control surfaces, generator means carried by said airplane and connected to said motors, a portion of said generator means acting in response to the yawing to said airplane to deliver energy to one of said motors to cause the operation of a portion of said control surfaces, another portion of said generator means acting in response to a sideslip of said airplane to deliver energy to another of said motors to cause the operation of another portion of said control surfaces, and still another portion of said generator means acting in response to a deviation of the speed of said airplane from normal to deliver energy to still another of said motors to cause the operation of still another of said control surfaces, all to the end that said airplane shall maintain normal flight continuously.

5. In an airplane having ailerons, a motor and connected transmission means for operating said ailerons, a generator carried by said airplane and connected to said motor to supply operating energy thereto, and means for reversing the current output of said generator, whereby the direction of rotation of said motor is reversed.

In testimony that I claim the invention set forth above I have hereunto set my hand this 13th day of March, 1930.

FRAZER W. GAY.